US007116960B2

(12) United States Patent
Kwon

(10) Patent No.: US 7,116,960 B2
(45) Date of Patent: Oct. 3, 2006

(54) IMAGE-REJECTING ANTENNA APPARATUS

(75) Inventor: Do-hoon Kwon, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 306 days.

(21) Appl. No.: 10/429,867

(22) Filed: May 6, 2003

(65) Prior Publication Data

US 2003/0207678 A1 Nov. 6, 2003

(30) Foreign Application Priority Data

May 6, 2002 (KR) ............................... 2002-24748

(51) Int. Cl.
*H04B 1/10* (2006.01)

(52) U.S. Cl. ...................... 455/285; 455/280; 455/286; 455/283

(58) Field of Classification Search ................ 455/285, 455/302, 269, 280, 284, 283, 287, 296, 307, 455/286; 343/820, 822, 850, 860, 907, 913, 343/909, 756, 722
See application file for complete search history.

(56) References Cited

U.S. PATENT DOCUMENTS

| | | | | |
|---|---|---|---|---|
| 2,270,416 | A | 1/1942 | Cork et al. | |
| 2,282,292 | A | 5/1942 | Amy et al. | |
| 4,885,802 | A * | 12/1989 | Ragan | 455/344 |
| 5,054,117 | A * | 10/1991 | Cruz et al. | 455/188.2 |
| 5,375,256 | A * | 12/1994 | Yokoyama et al. | 455/80 |
| 5,523,801 | A * | 6/1996 | Tanaka et al. | 348/737 |
| 5,999,135 | A | 12/1999 | Nozaki et al. | |
| 6,453,157 | B1 * | 9/2002 | Roberts | 455/337 |
| 6,553,216 | B1 * | 4/2003 | Pugel et al. | 455/340 |
| 6,681,103 | B1 * | 1/2004 | Rogers et al. | 455/302 |
| 6,738,611 | B1 * | 5/2004 | Politi | 455/302 |

FOREIGN PATENT DOCUMENTS

| | | |
|---|---|---|
| EP | 0 892 840 A2 | 1/1999 |
| EP | 0 892 840 A3 | 1/1999 |
| GB | 1007791 | 10/1965 |
| JP | 61-88351 (U) | 6/1986 |
| JP | 6-244756 | 9/1994 |
| JP | 11-103260 | 4/1999 |

OTHER PUBLICATIONS http://www.kyes.com/antenna/coaxfilter.html, Jan. 30, 2006, "Coax Filter".*

* cited by examiner

*Primary Examiner*—Quochien B. Vuong
*Assistant Examiner*—Christian A. Hannon
(74) *Attorney, Agent, or Firm*—Lee & Morse, P.C.

(57) ABSTRACT

An image-rejecting antenna apparatus includes an antenna unit for receiving or transmitting a wireless signal and an image-reject unit for removing an image component signal having a predetermined frequency from among signals received from the antenna unit. In an image-rejecting antenna apparatus that receives a predetermined signal and provides a processed signal to a RF circuit unit for performing a predetermined function may also include an impedance matching unit for matching an impedance of the antenna unit with an impedance of the RF circuit unit and for providing the signal from which the image component signal has been removed to the RF circuit unit. A noise component of an image frequency that is transmitted to a subsequent circuit can be minimized or removed by including an image-reject unit when designing an antenna and a matching circuit, thereby improving the image-rejecting capabilities of an entire receiver.

4 Claims, 5 Drawing Sheets

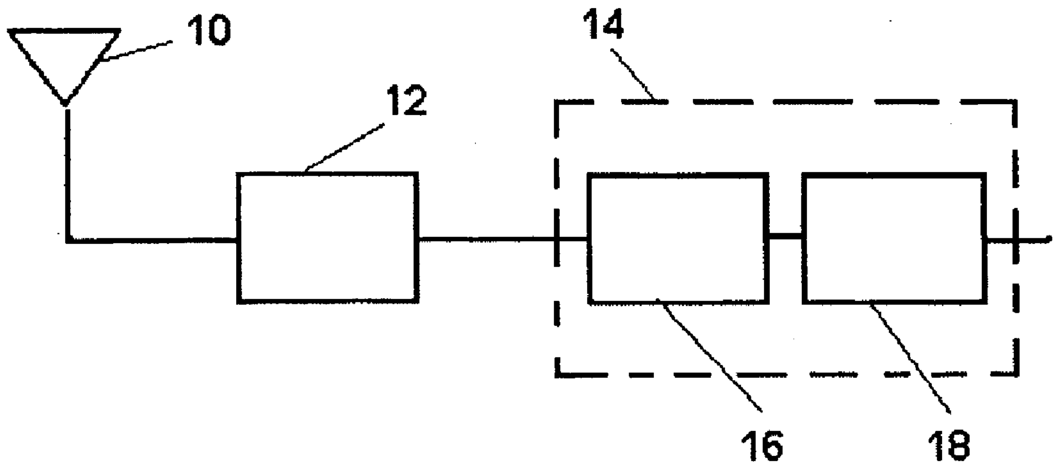
Fig. 1 [ Prior Art ]

IMAGE-REJECTING ANTENNA APPARATUS

BACKGROUND OF THE INVENTION

1. Field of the Invention

The present invention relates to an image-reject antenna apparatus having a function for intercepting an image frequency signal among signals received from an antenna unit.

2. Description of the Related Art

Conventionally, an analog unit of a receiver for wireless communications includes an antenna and a function for converting an electrical signal that is received from the antenna into a low frequency signal or a baseband signal centered at direct current (DC). In a structure in which an image frequency exists, i.e., a heterodyne system, among structures of receivers, a function for suppressing a noise signal in an image frequency band is an important factor that determines reception performance of the receiver. Methods for suppressing an image include using an image-reject filter, an image-reject mixer, or a weaver. These methods have been extensively studied.

FIG. 1 is a block diagram of a conventional heterodyne receiver, which is a representative example of a receiver having an image frequency component in a received signal according to the prior art. The conventional heterodyne receiver illustrated in FIG. 1 includes an antenna 10, an impedance matching circuit 12, and a receiver 14 including an image reject filter 16 and a down conversion mixer 18.

FIGS. 2A–2C illustrate a frequency region spectrum of a radio frequency (RF) input signal of an image-reject filter and an output signal of a down conversion mixer when a desired signal and an image signal, illustrated in FIG. 2A, pass through the image-reject filter and the down conversion mixer in the conventional heterodyne receiver of FIG. 1. FIG. 2C illustrates the output signal in a frequency domain. In this case, it was assumed that a large interference signal exists in an image frequency band among signals that are received from an antenna and that the large interference signal passes through a matching circuit.

Referring to FIGS. 1 and 2, an RF signal having a desired component and an image component is received via the antenna 10, and passes through a radio frequency (RF) band pass filter (BPF) having a central frequency of RF, which is included in the image reject filter 16, in order to pass the RF signal. The image reject filter 16 rejects the image signal from the RF signal. The rejected image signal is mixed with a local oscillation signal from a local oscillator LO, to be down-converted into an intermediate signal. An intermediate frequency (IF) BPF passes only the intermediate frequency signal. As illustrated in FIG. 2C, at an intermediate frequency, there remains a desired signal and an image signal whose amplitude is attenuated but not completely rejected by the image-reject filter.

Antennas have different characteristics depending on frequencies in view of electrical characteristics. According to a design principle of a traditional antenna and matching circuit, an antenna is designed to effectively convert an over-the-air broadcast signal in a desired frequency band into an electrical signal. In addition, a corresponding matching circuit is designed to convert an input impedance of the antenna at a desired frequency, into a reference impedance (usually, 50 Ω) without losses. That is, a frequency of interest in designing both the antenna and the matching circuit is limited to a desired band. Characteristics of the antenna and the matching circuit at a frequency other than the desired band, such as an image frequency band of a noise signal, is not considered.

Thus, a method that effectively receives a signal having a desired frequency band and suppresses an image noise signal in an antenna and a matching circuit for matching the antenna with a stipulated impedance line is not conventionally known.

SUMMARY OF THE INVENTION

In an effort to solve the problem described above, it is a feature of an embodiment of the present invention to provide an image-reject antenna that rejects an image component signal in an antenna for receiving a wireless signal and a matching circuit for matching the antenna with a stipulated impedance line.

To provide the above feature, there is provided an image-rejecting antenna apparatus including an antenna unit for receiving a wireless signal, and an image-reject unit for removing an image component signal having a predetermined frequency band from among signals received from the antenna unit.

In a preferred embodiment, the image-reject unit is preferably connected to the antenna unit and a ground point and is shorted at a central frequency of the frequency band of the image component signal. The image-reject unit may be an open stub having a length equal to one-quarter of a wavelength of the image component signal.

In an alternate embodiment, the image-reject unit is a notch filter, which resonates at a frequency of an imaginary number component of the signal received from the antenna unit, and is installed at a distance from the antenna unit that is shorter than a wavelength of the imaginary number component.

According to another feature there is provided an image-rejecting antenna apparatus that receives a predetermined signal and provides a processed signal to a radio frequency (RF) circuit unit for performing a predetermined function, including an antenna unit for receiving a wireless signal, an image-reject unit for removing an image component signal having a predetermined frequency band from among signals received from the antenna unit, and an impedance matching unit for matching an impedance of the antenna with an impedance of the RF circuit unit and for providing the processed signal from which the image signal has been removed to the RF circuit unit.

In a third embodiment, the image-reject unit is preferably a band-pass filter (BPF) having a central frequency equal to a central frequency of the image component signal frequency band, which is positioned in parallel to the front or rear of the impedance matching unit, for passing only the frequency band of the image component signal among the signals received from the antenna unit.

In a fourth embodiment, the image-reject unit is preferably a notch filter having a central frequency equal to a central frequency of the image component signal frequency band, which is positioned in series to the front or rear of the impedance matching unit and passes all frequencies except the frequency band of the image component signal among the signals received from the antenna unit.

BRIEF DESCRIPTION OF THE DRAWINGS

The above features and advantages of the present invention will become more apparent to those of ordinary skill in the art by describing in detail preferred embodiments thereof with reference to the attached drawings in which:

FIG. 1 is a block diagram of a conventional heterodyne receiver, which is a representative example of a receiver having an image frequency component in a received signal, according to the prior art;

DETAILED DESCRIPTION OF THE INVENTION

Figure 2A:
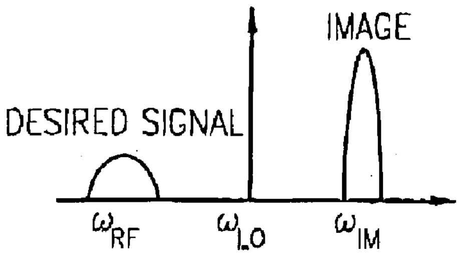
FIG. 2A (PRIOR ART)
FIG. 2A illustrates a frequency spectrum of a desired signal and an image signal of a radio frequency (RF) input signal of an image-reject filter.
Figure 2B:
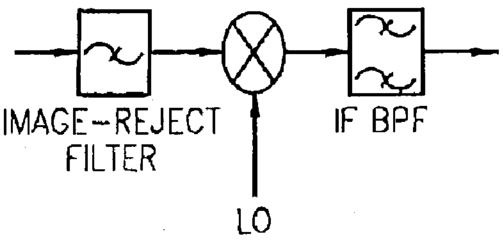
FIG. 2B (PRIOR ART)
FIG. 2B illustrates the image-reject filter and the down conversion mixer in the conventional heterodyne receiver of FIG. 1 through which the RF input signal passes.
Figure 2C:
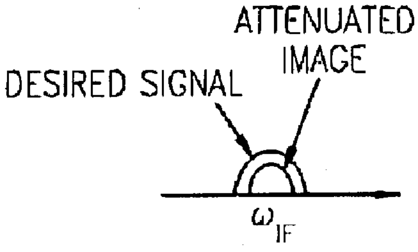
FIG. 2C (PRIOR ART)
FIG. 2C illustrates the frequency spectrum of an output signal of the down conversion mixer when the desired signal and the image signal pass through the image-reject filter and the down conversion mixer in the conventional heterodyne receiver of FIGS. 1 and 2B.

Korean Patent Application No. 2002-24748, filed on May 6, 2002, and entitled: "Image-Reject Antenna," is incorporated by reference herein in its entirety.

Hereinafter, the present invention will be described in detail by describing preferred embodiments of the invention with reference to the accompanying drawings. Like reference numerals indicate like elements throughout.

If an image frequency existence method is adopted to design the structure of a receiver, a corresponding image frequency band cannot be precisely known. Thus, the fact that a noise component in an image band where an image signal exists should be suppressed in a circuit, can be applied to design an antenna and an impedance matching circuit. Accordingly, an antenna may be designed to effectively receive a signal having a desired frequency band and simultaneously be designed to suppress a signal having an image frequency band. In addition, an impedance matching circuit may be designed to pass a signal in a frequency band of a desired signal and to suppress a signal having an image frequency band. If the antenna and the impedance matching circuit that are designed as above are independently constituted or combined, even though there is an over-the-air broadcast-shaped large image noise component, while a small noise is received, an even smaller quantity of image noise is actually transmitted to a subsequent circuit.

Figure 3:
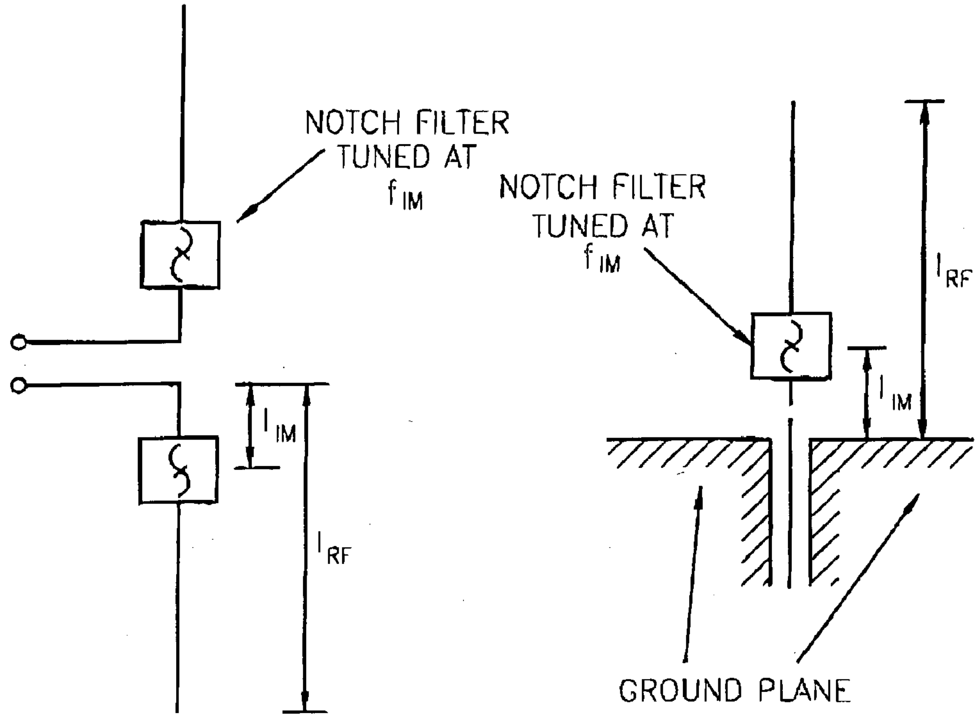
FIG. 3 illustrates a dipole antenna and a monopole antenna having an additional image-reject function according to an embodiment of the present invention.

FIG. 3 illustrates an example where the present invention is applied to dipole and monopole wire antennas. A length of the entire wire is $l_{RF}$ A notch (band-stop) filter is installed at a location a distance $l_{IM}$ from a feeding point. The stop frequency band of the installed notch filter is equal to an image frequency band, and the notch filter is tuned to a central frequency of the image frequency band $f_{IM}$. Hence, in view of electrical characteristics, the antennas of FIG. 3 effectively have a length $l_{IM}$ in the image frequency band and a length $l_{RF}$ in another frequency band, including a desired frequency.

According to antenna engineering, if the length of the wire antenna is significantly smaller than a wavelength corresponding to an operating frequency, the real number part of the input impedance of the antenna is near zero (0), and an imaginary number part thereof becomes very large. Assuming the antenna is connected to a feeding line having a standard impedance (i.e., 50 Ω), the antenna is barely able to perform transmission and reception functions at a corresponding frequency. If the notch filter is installed to be near the feeding point so that the length of the antenna may be smaller than a corresponding wavelength in an image noise frequency band, the antenna barely receives a signal having the image frequency band. In such a case, when a central frequency of the image frequency band is $f_{IM}$, a wavelength corresponding to the central frequency of the image frequency band $f_{IM}$ is $\lambda_{IM}$, and a relation of $l_{IM} << \lambda_{IM}/4$ is satisfied. In addition, when a desired frequency is $f_{RF}$, a wavelength corresponding to the desired frequency $f_{RF}$ is $\lambda_{RF}$. In an arrangement where a notch filter is inserted, the length $l_{RF}$ of the antenna is adjusted such that a reception function may be effectively performed at the desired frequency $f_{RF}$. That is, the input impedance of the antenna is near the standard impedance used.

The antenna performs transmission and reception functions at the desired frequency $f_{RF}$ and barely performs transmission and reception functions at the central frequency of the image frequency band $f_{IM}$. Unlike the present invention, a problem with conventional antennas is that conventional antennas are designed to perform transmission and reception functions effectively at the desired frequency $f_{RF}$ without concern for the image frequency, and thus conventional antennas also receive a larger quantity of image noise at the central frequency of the image frequency band $f_{IM}$.

Figure 4:
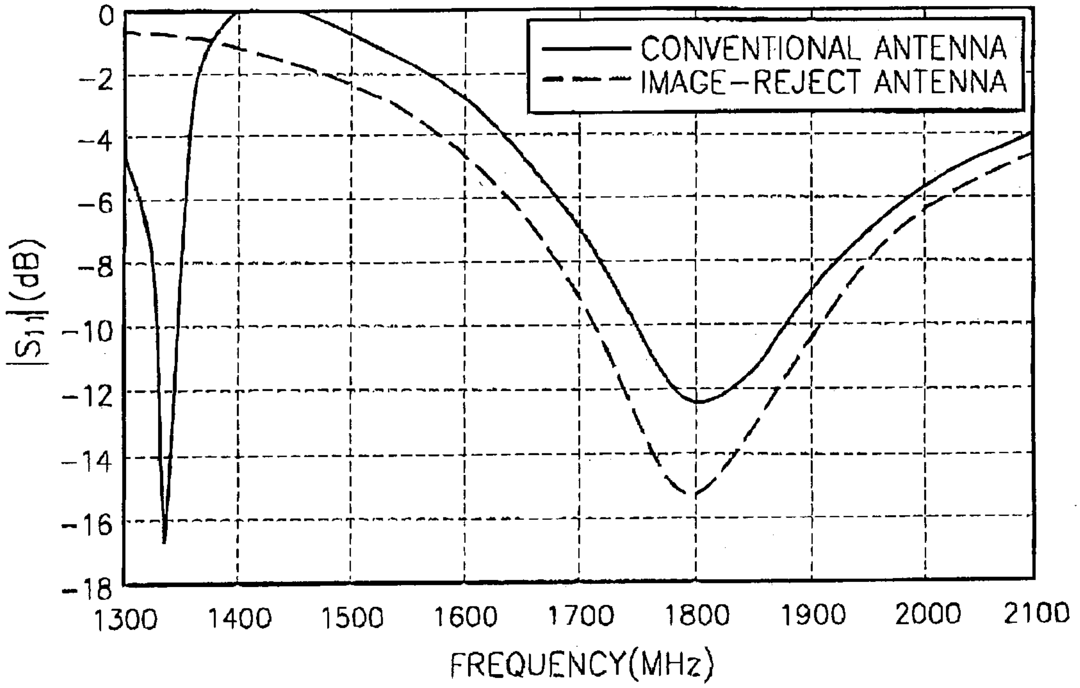
FIG. 4 is a graph showing the size of a reflection loss with respect to a stipulated impedance of 50 Ω of both an image-reject dipole antenna for a Korean PCS communication band according to an embodiment of the present invention and a conventional antenna.
Figure 5:
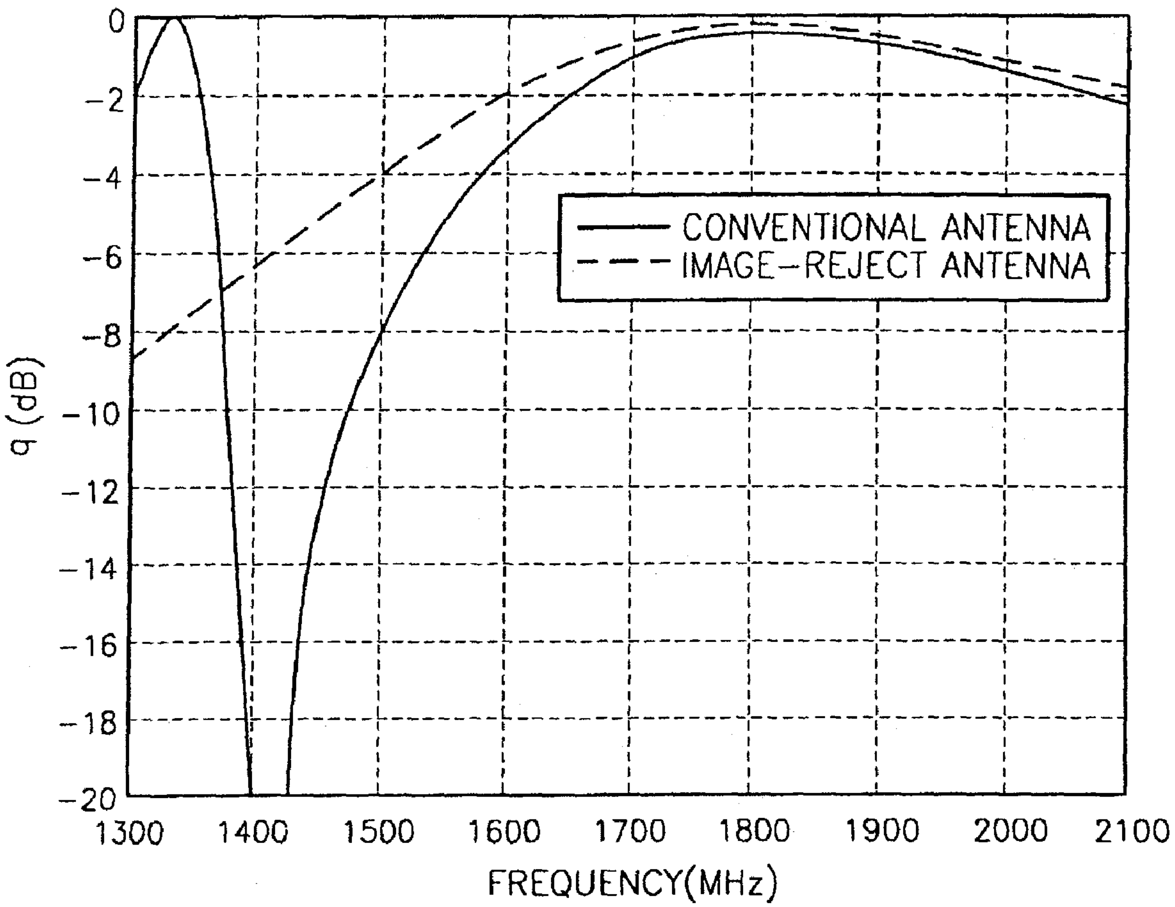
FIG. 5 is a graph showing the case where the reflection loss of FIG. 4 is converted into an impedance mismatch factor and the effectiveness with which the image-reject antenna and the conventional antenna receive and transmit a signal.

FIGS. 4 and 5 show the results of a simulation in which an image-reject antenna according to an embodiment of the present invention is applied to a dipole antenna for a Korean PCS wireless terminal. FIG. 4 illustrates a case where a reflection loss $S_{11}$ is marked by the function of a frequency at an antenna input terminal, and FIG. 5 illustrates a case where an impedance mismatch factor $q=1-|S_{11}|^2$ is marked by the function of a frequency at an antenna input terminal, when both are measured by an antenna designer with interest. As may be seen in FIG. 4, as the value of $S_{11}$ decreases, transmission and reception functions become more effectively performed at a corresponding frequency. As the value of $S_{11}$ increases, transmission and reception functions are barely performed due to impedance mismatches. Conversely, as may be seen in FIG. 5, as a value of q approaches zero (0) dB, transmission and reception functions become more effectively performed. In Korean PCS communications, a transmission frequency of 1750 MHz to 1780 MHz and a reception frequency of 1840 MHz to 1870

MHz are used, a PCS terminal adopts a heterodyne type reception method, and an intermediate frequency is 220.38 MHz. From these standard requirements, an image frequency band is set to between 1399.2 MHz and 1429.2 MHz.

In FIGS. 4 and 5, a solid line represents a conventional dipole antenna and a dashed line represents an image-reject dipole antenna according to an embodiment of the present invention. An Inductance-Capacitance (LC) parallel resonance filter is used for a band-pass filter (BPF), and a resonance point of the LC parallel resonance filter is set to 1414 MHz as a central frequency of the image frequency band. According to the present invention, $S_{11}$ is slightly increased at a transmission and reception band (1750 MHz to 1870 MHz) of PCS, and thus a bandwidth is slightly decreased. An increase in $S_{11}$, however, causes only a difference of 1/n to q, wherein n is an integer under 10.

In the transmission and reception image frequency band, the value of q of the antenna according to the present invention is a minimum of 10 dB lower than that of the conventional antenna. Thus, an antenna according to the present invention receives a smaller quantity by a minimum of 10 dB of a noise component than a conventional antenna when considering a noise signal in an image frequency band that exists in an over-the-air broadcast shape.

A matching circuit may also be designed to have an image-reject function. A matching circuit having an image-reject function may be combined with the previous image-reject antenna or a conventional antenna.

When there is a significant difference in an input impedance of an antenna and a standard impedance in a desired frequency band, an impedance matching circuit converts the input impedance of the antenna into the standard impedance while minimizing losses in the matching circuit. In a conventional method for designing a matching circuit, desired impedance conversion is performed in a desired frequency band, but impedance conversion characteristics in another frequency band, such as a noise-image frequency band, are not considered. In the present invention, a matching circuit is designed to perform impedance conversion in a desired frequency band and impedance mismatches in a desired image frequency band, so that an image-reject effect may be obtained in the matching circuit.

Preferably, the size of the reflection loss $S_{11}$ of the antenna and the matching circuit as seen by the receiver is set to one (1). In order to set the size of $S_{11}$ to one (1) when using the matching circuit without losses, input impedances of the antenna and the matching circuit may have pure imaginary number components or infinite real (R) components. Thus, the matching circuit is only designed to have electrical characteristics of a "short" or "breaking a wire" in an image frequency band.

Figure 6:
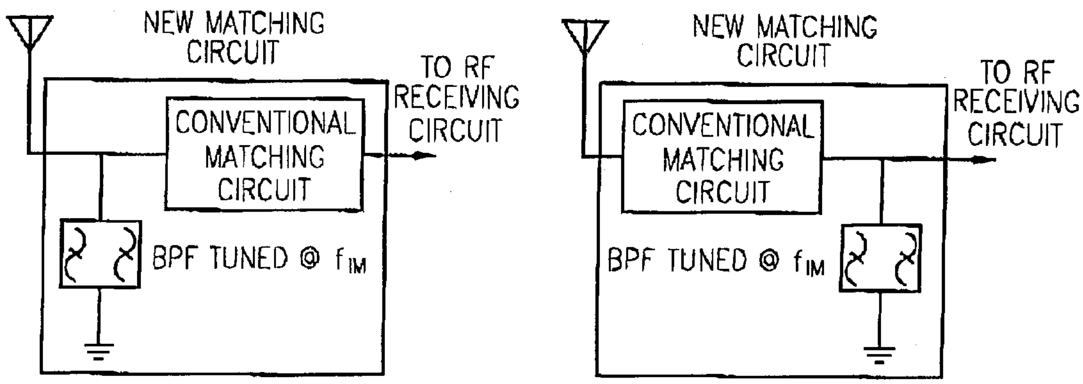
FIG. 6 illustrates an arrangement in which an image frequency band-pass filter (IF BPF) that passes a frequency band of an image component signal is positioned in parallel with an impedance matching circuit according to a third embodiment of the present invention.

In one embodiment of the present invention, the electrical characteristics of a "short" may be obtained by connecting a BPF, which is tuned to a central frequency of the image frequency band $f_{IM}$, in parallel to the front or rear of an existing conventional matching circuit, as shown in FIG. 6. The BPF tuned to the central frequency of the image frequency band $f_{IM}$ passes only frequencies in the image frequency band. Therefore, by connecting the BPF in parallel with the conventional matching circuit, the effect of a short circuit may be obtained. In this way, because of the BPF, the size of $S_{11}$ becomes one (1) at the central frequency of the image frequency band $f_{IM}$. The remaining portions of a new matching circuit are designed by a traditional method such that the impedance of the antenna at the desired frequency $f_{RF}$ is converted into the standard impedance with a response at the desired frequency $f_{RF}$ of the BPF.

Figure 7:
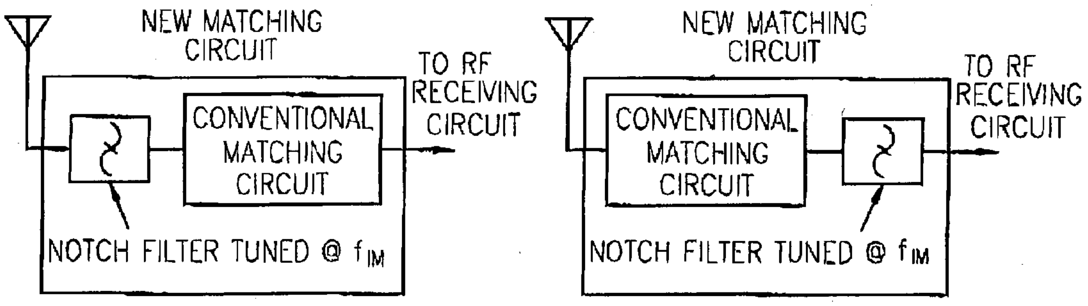
FIG. 7 illustrates an arrangement in which a notch filter that does not pass a frequency band of an image component signal is positioned in series with the impedance matching circuit according to a fourth embodiment of the present invention.

In another embodiment of the present invention, the electrical characteristics of "breaking a wire," or an open circuit, may be obtained by connecting a notch filter, which is tuned at the central frequency of the image frequency band $f_{IM}$, in series to the front or rear of an existing conventional matching circuit, as shown in FIG. 7. The notch filter tuned to the central frequency of the image frequency band passes all frequencies except those in the image frequency band. Therefore, by connecting the notch filter in series with the conventional matching circuit, the effect of breaking a wire may be obtained. The remaining portions of the matching circuit excluding the notch filter are designed to convert the impedance of the antenna at the desired frequency $f_{RF}$ into the standard impedance.

When the matching circuit is constituted by a combination of elements without losses, such as L and C, and if the BPF or notch filter tuned at the central frequency of the image frequency band $f_{IM}$ is used, it is assured that the size $S_{11}$ is one (1) at the central frequency of the image frequency band $f_{IM}$. If the remaining portions of the matching circuit are designed in consideration of the effect at the frequency of the BPF and the notch filter, the size of $S_{11}$ may be minimized at the desired frequency $f_{RF}$, and methods therefor are well known. In addition, when the BPF or notch filter tuned at the central frequency of the image frequency band $f_{IM}$ is used, the filter need not necessarily be positioned in a final terminal of the antenna of the matching circuit or a final terminal of a RF receiving circuit, as shown in FIGS. 6 and 7. Even when elements/functioning portions of the filter are positioned in a middle location other than both final terminals of the entire matching circuit, the matching circuit performs an image-reject function. FIGS. 6 and 7 illustrate embodiments in which the filter may be positioned at either final terminal of the matching circuit.

Figure 8:
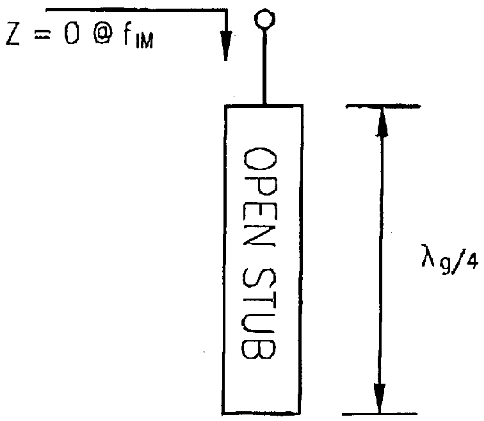
FIG. 8 illustrates a structure for implementing various embodiments of the present invention in which an input impedance at an image frequency is zero (0) using an open stub tuner.

FIG. 8 illustrates a structure for implementing various embodiments of the present invention in which the length of an open stub is $\lambda_g/4$ and an impedance (Z) seen from an input terminal of the stub is zero (0) at a frequency equal to the central frequency of the image frequency band $f_{IM}$, which is easily implemented by a printed circuit technique. Here, $\lambda_g$ represents a guided wavelength of a transmission line that is implemented on a printed circuit substrate.

According to the present invention, noise in the form of an image component signal in an image frequency band that is transmitted to a subsequent circuit may be minimized or removed by including an image-reject function when designing the antenna and/or the matching circuit, thereby realizing improved image-reject performance of an entire receiver.

In addition, if standard requirements of a system for desired image-reject performance are defined, use of the present invention can provide part of the image-reject requirements for the system in the antenna and the matching circuit, and the remaining suppression amount may be obtained in a circuit design portion, thereby reducing the standard requirements for image-reject performance that must be obtained in the circuit.

The image-reject effect of the present invention is applied to the antenna and the matching circuit separately, and thus only the antenna, only the matching circuit, or both may be modified in existing wireless communication devices, thereby obtaining improved image-reject performances.

Preferred embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. An image-rejecting antenna apparatus comprising:

an antenna for receiving a wireless signal, the antenna adapted for removing an image component of the wireless signal; and an image-reject unit coupled to the antenna, wherein the antenna includes at least one notch filter coupling adjacent portions of elements of the antenna and tuned to a center frequency of the image component of the wireless signal, and wherein the antenna is a dipolar wire antenna including:

a first wire element comprising a first notch filter of the at least one notch filter, the first notch filter coupled in series with portions of the first wire element; and a second wire element comprising a second notch filter of the at least one notch filter, the second notch filter coupled in series with portions of the second wire element.

2. An image-rejecting antenna apparatus comprising:

an antenna for receiving a wireless signal, the antenna adapted for removing an image component of the wireless signal; and an image-reject unit coupled to the antenna, wherein the antenna includes at least one notch filter coupling adjacent portions of elements of the antenna and tuned to a center frequency of the image component of the wireless signal, and wherein the antenna is a monopolar wire antenna including a wire element comprising a notch filter of the at least one notch filter, the notch filter coupled in series with portions of the wire element.

3. An image-rejecting antenna apparatus of a RF circuit, the image-rejecting antenna apparatus comprising:

an antenna for receiving a wireless signal;

an impedance matching unit adapted for matching an impedance of the antenna with impedance of the RF circuit in a frequency band of the wireless signal; and at least one image-reject unit coupled to the impedance matching unit and tuned to a center frequency of an image component of the wireless signal, wherein the impedance matching unit is coupled to the antenna and the image-reject unit comprises a band-pass filter coupled in parallel to an input of the impedance matching unit.

4. An image-rejecting antenna apparatus of a RF circuit, the image-rejecting antenna apparatus comprising:

an antenna for receiving a wireless signal;

an impedance matching unit adapted for matching an impedance of the antenna with impedance of the RF circuit in a frequency band of the wireless signal; and at least one image-reject unit coupled to the impedance matching unit and tuned to a center frequency of an image component of the wireless signal, wherein the impedance matching unit is coupled to the antenna and the image-reject unit comprises a band-pass filter coupled in parallel to an output of the impedance matching unit.

* * * * *